(No Model.)

L. L. MOE.
BICYCLE.

No. 593,363. Patented Nov. 9, 1897.

Witnesses
H. E. Clendaniel.
Thos. F. Robertson.

Inventor
Leonidas L. Moe
By T. J. W. Robertson
Attorney

THE NORRIS PETERS CO., PHOTO-LITHO., WASHINGTON, D. C.

UNITED STATES PATENT OFFICE.

LEONIDAS L. MOE, OF DENVER, COLORADO.

BICYCLE.

SPECIFICATION forming part of Letters Patent No. 593,363, dated November 9, 1897.

Application filed October 29, 1895. Serial No. 567,283. (No model.)

*To all whom it may concern:*

Be it known that I, LEONIDAS L. MOE, a citizen of the United States, residing at Denver, in the county of Arapahoe and State of Colorado, have invented a certain new and useful Improvement in Bicycles, of which the following is a specification, reference being had to the accompanying drawings.

This improvement relates to that class of bicycles in which multiplying-gearing is interposed between the sprocket-wheel on the crank-shaft and that on the rear wheel; and the invention consists in the peculiar construction, arrangement, and combinations of parts, hereinafter more particularly described and then definitely claimed.

Figure 1:
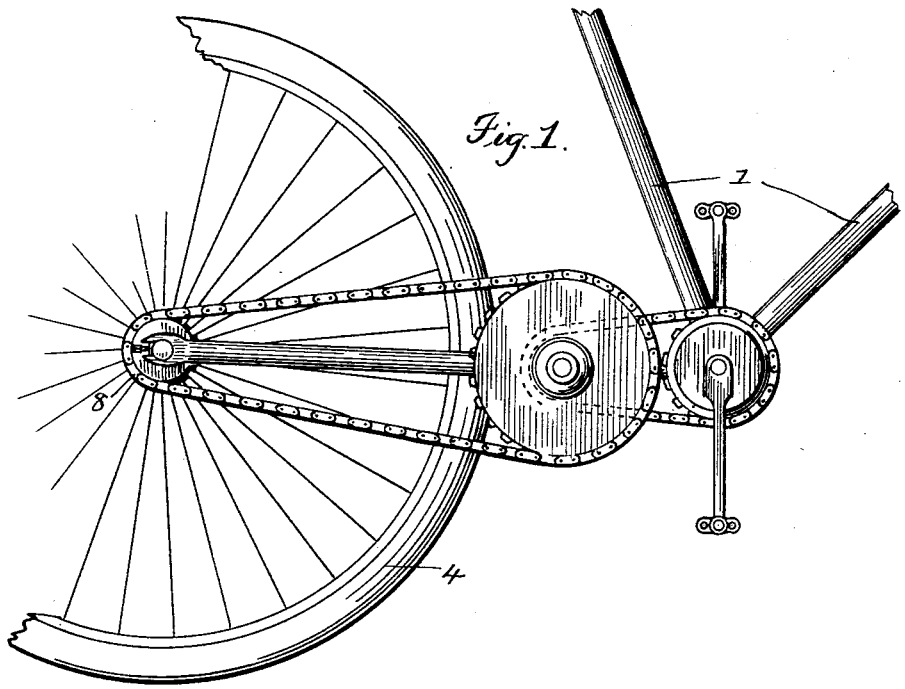
Figure 2:
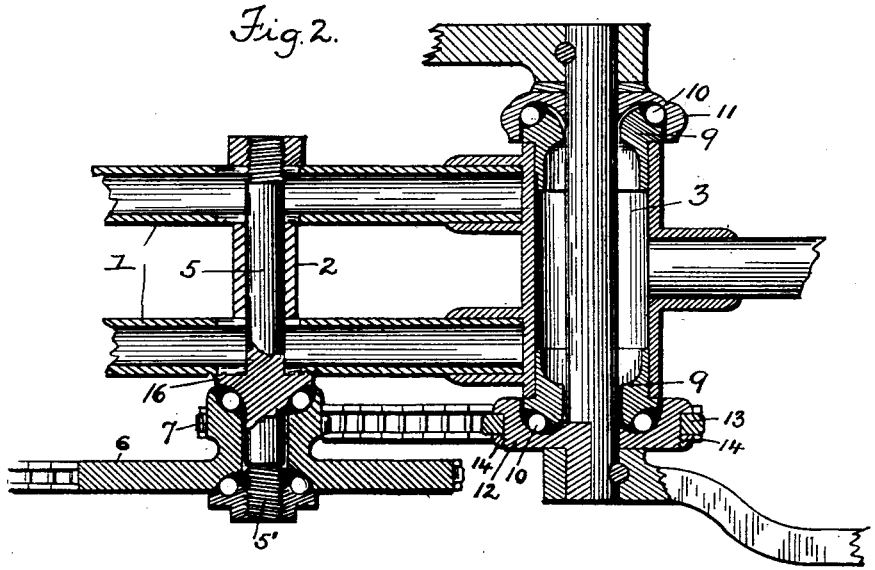

In the accompanying drawings, Figure 1 is a side view of a bicycle constructed according to my improvement. Fig. 2 is a horizontal section of the same.

Referring now to the details of the drawings by figures, 1 represents the frame of the machine of any approved form, provided with a hollow sleeve or brace 2 between the crank-axle bearing 3 and the rear wheel 4. Through this brace runs a bolt 5, having an extension 5' at one side of the frame which forms a bearing for the multiplying-gear, consisting of a sprocket-wheel having two sets of teeth 6 and 7, the larger of which carries a chain that passes around the sprocket-wheel 8 on the rear wheel 4. The double-toothed wheel 6 7 should of course be provided with ball-bearings, as shown in the drawings. The bearing for the axle contains two "cones" 9 to receive the balls 10, which are held in place on one side by the nut 11 and on the other by the cap 12, attached to and turning with the shaft. This cap forms a bearing to receive a toothed ring or wheel 13, which is held in place by a nut 14, screwed on the cap, so that by removing the nut a larger or smaller ring may be attached, whereby the speed of the bicycle may be changed to some extent. A chain connects the toothed ring 13 with the small set of teeth on the combined wheel. With this arrangement it is obvious that a much greater speed can be obtained in a bicycle, because the wheel or ring 13 is larger than the small part of the intermediate wheel and the larger part is larger than the wheel on the rear driving-wheel.

As shown in Fig. 2, the rods are slotted, and the outer edge on the gearing side is notched or grooved. The bolt 5 has a head 16, which is notched or grooved to correspond with the grooves or notches on the side of the frame. The end of the bolt 5 opposite the head is threaded to receive a nut by which the brace is secured in place. With this arrangement it is obvious that the chain on the crankshaft may be tightened at will by loosening the nut and shifting the axle toward the rear and then tightening the nut. The other chain can of course be tightened in the ordinary way.

What I claim as new is—

In a bicycle, a bolt carrying an intermediate wheel passing through slots in and connecting the lower rods of the frame, provided with a head at one end having notches corresponding to notches in the frame, and a nut at the other end to secure said bolt, and a sleeve between said lower rods, substantially as described.

In testimony whereof I affix my signature, in the presence of two witnesses, this 26th day of October, 1895.

LEONIDAS L. MOE.

Witnesses:
 W. A. PREUITT,
 CHAS. L. MOE.